(12) United States Patent
Pankaj et al.

(10) Patent No.: US 10,508,546 B2
(45) Date of Patent: Dec. 17, 2019

(54) TURBOMACHINE WITH ALTERNATINGLY SPACED TURBINE ROTOR BLADES

(71) Applicant: General Electric Company, Schenectady, NY (US)

(72) Inventors: Peeyush Pankaj, Bangalore (IN); Shashank Suresh Puranik, Bangalore (IN); Darek Tomasz Zatorski, Fort Wright, KY (US); Christopher Charles Glynn, Clearwater Beach, FL (US); Richard Schmidt, Loveland, OH (US)

(73) Assignee: General Electric Company, Schenectady, NY (US)

( * ) Notice: Subject to any disclaimer, the term of this patent is extended or adjusted under 35 U.S.C. 154(b) by 109 days.

(21) Appl. No.: 15/710,109

(22) Filed: Sep. 20, 2017

(65) Prior Publication Data

US 2019/0085701 A1    Mar. 21, 2019

(51) Int. Cl.
| | |
|---|---|
| *F01D 5/03* | (2006.01) |
| *F01D 5/14* | (2006.01) |
| *F01D 1/26* | (2006.01) |
| *F01D 9/04* | (2006.01) |
| *F02C 7/06* | (2006.01) |
| *F02C 7/32* | (2006.01) |
| *F02C 7/36* | (2006.01) |
| *F02C 3/067* | (2006.01) |
| *F01D 25/16* | (2006.01) |

(52) U.S. Cl.
CPC ............. *F01D 5/03* (2013.01); *F01D 1/26* (2013.01); *F01D 5/142* (2013.01); *F01D 9/041* (2013.01); *F01D 25/164* (2013.01); *F02C 3/067* (2013.01); *F02C 7/06* (2013.01); *F02C 7/32* (2013.01); *F02C 7/36* (2013.01); *F05D 2240/12* (2013.01); *F05D 2240/24* (2013.01); *F05D 2260/4031* (2013.01); *F05D 2260/40311* (2013.01)

(58) Field of Classification Search
CPC ..... F01D 1/18; F01D 1/20; F01D 1/24; F01D 1/26; F01D 5/03; F01D 5/06
USPC ........................................................ 416/122
See application file for complete search history.

(56) References Cited

U.S. PATENT DOCUMENTS

| | | |
|---|---|---|
| 2,478,206 A | 8/1949 | Redding |
| 3,546,880 A | 12/1970 | Schwaar |
| 4,296,599 A | 10/1981 | Adamson |
| 4,621,978 A | 11/1986 | Stuart |
| 4,947,642 A | 8/1990 | Grieb et al. |
| 6,619,030 B1 | 9/2003 | Seda et al. |
| 6,763,654 B2 | 7/2004 | Orlando et al. |

(Continued)

*Primary Examiner* — Richard A Edgar
(74) *Attorney, Agent, or Firm* — Dority & Manning, P.A.

(57) ABSTRACT

A turbomachine includes a turbine section including a turbine, the turbine having a plurality of turbine rotor blades spaced along the axial direction, each turbine rotor blade extending generally along the radial direction between a radial inner end and a radial outer end. The plurality of turbine rotor blades includes a first turbine rotor blade; and a second turbine rotor blade spaced from the first turbine rotor blade along the axial direction, the radial outer end of the first turbine rotor blade coupled to the radial outer end of the second turbine rotor blade. The plurality of turbine rotor blades additionally includes a third turbine rotor blade spaced from the second turbine rotor blade along the axial direction, the radial inner end of the second turbine rotor blade coupled to the radial inner end of the third turbine rotor blade.

20 Claims, 4 Drawing Sheets

(56) References Cited

U.S. PATENT DOCUMENTS

| | | |
|---|---|---|
| 7,186,073 B2 | 3/2007 | Orlando et al. |
| 7,195,446 B2 | 3/2007 | Seda et al. |
| 7,269,938 B2 | 9/2007 | Moniz et al. |
| 7,290,386 B2 | 11/2007 | Orlando et al. |
| 7,334,981 B2 | 2/2008 | Moniz et al. |
| 7,451,592 B2 | 11/2008 | Taylor et al. |
| 7,594,388 B2 | 9/2009 | Cherry et al. |
| 8,191,352 B2 * | 6/2012 | Schilling ............... F01D 5/03 416/122 |
| 8,402,742 B2 | 3/2013 | Roberge et al. |
| 8,876,462 B2 | 11/2014 | Balk et al. |
| 9,011,076 B2 | 4/2015 | Suciu et al. |
| 9,017,028 B2 | 4/2015 | Fabre |
| 9,022,725 B2 | 5/2015 | Merry et al. |
| 9,028,200 B2 | 5/2015 | Suciu et al. |
| 9,074,485 B2 | 7/2015 | Suciu et al. |
| 9,080,512 B2 | 7/2015 | Suciu et al. |
| 9,194,290 B2 | 11/2015 | Suciu et al. |
| 2005/0226720 A1 | 10/2005 | Harvey et al. |
| 2006/0090451 A1 * | 5/2006 | Moniz ..................... F01D 1/24 60/226.1 |
| 2008/0184694 A1 | 8/2008 | Guimbard et al. |
| 2013/0219859 A1 | 8/2013 | Suciu et al. |
| 2014/0241856 A1 | 8/2014 | Roberge et al. |
| 2015/0354502 A1 | 12/2015 | Kuhne et al. |
| 2016/0195010 A1 | 7/2016 | Roberge |
| 2018/0274365 A1 * | 9/2018 | Stuart ..................... F01D 1/26 |

\* cited by examiner

TURBOMACHINE WITH ALTERNATINGLY SPACED TURBINE ROTOR BLADES

FIELD

The present subject matter relates generally to a turbomachine, and more particularly, to a turbine of a turbomachine having turbine rotor blades coupled using a split drum configuration.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Within at least certain gas turbine engines, the turbine section may include interdigitated rotors (i.e., successive rows or stages of rotating airfoils or blades). For example, a turbine section may include a turbine having a first plurality of low speed turbine rotor blades and a second plurality of high speed turbine rotor blades. The first plurality of low speed turbine rotor blades may be interdigitated with the second plurality of high speed turbine rotor blades. Such a configuration may result in a more efficient turbine.

However, several problems may arise with such a configuration relating to unwanted vibrations (e.g., vibration modes), clearance issues between the first and second pluralities of rotor blades, etc. Accordingly, an improved turbine with interdigitated turbine rotor blades would be useful.

BRIEF DESCRIPTION

Aspects and advantages of the invention will be set forth in part in the following description, or may be obvious from the description, or may be learned through practice of the invention.

In one exemplary embodiment of the present disclosure, a turbomachine defining a radial direction and an axial direction is provided. The turbomachine includes a turbine section including a turbine, the turbine having a plurality of turbine rotor blades spaced along the axial direction, each turbine rotor blade extending generally along the radial direction between a radial inner end and a radial outer end. The plurality of turbine rotor blades includes a first turbine rotor blade; and a second turbine rotor blade spaced from the first turbine rotor blade along the axial direction, the radial outer end of the first turbine rotor blade coupled to the radial outer end of the second turbine rotor blade. The plurality of turbine rotor blades additionally includes a third turbine rotor blade spaced from the second turbine rotor blade along the axial direction, the radial inner end of the second turbine rotor blade coupled to the radial inner end of the third turbine rotor blade.

In certain exemplary embodiments the turbomachine further includes a spool, wherein the first turbine rotor blade is coupled to the spool at the inner end of the first turbine rotor blade through a first support member assembly.

In certain exemplary embodiments the first turbine rotor blade, the second turbine rotor blade, and the third turbine rotor blade are each spaced sequentially along the axial direction.

In certain exemplary embodiments the plurality of turbine rotor blades is a first plurality of turbine rotor blades, and wherein the turbine further includes a second plurality of turbine rotor blades, wherein the second plurality of turbine rotor blades includes at least one turbine rotor blade positioned between the first and second turbine rotor blades of the first plurality of turbine rotor blades or between the second and third turbine rotor blades of the first plurality of turbine rotor blades.

In certain exemplary embodiments the plurality of turbine rotor blades is a plurality of low-speed turbine rotor blades.

For example, in certain exemplary embodiments the turbine further includes a plurality of high-speed turbine rotor blades, wherein each of the high-speed turbine rotor blades extends generally along the radial direction between a radial inner end and a radial outer end. Additionally, such an exemplary embodiment, the plurality of high-speed turbine rotor blades may further include a first high-speed turbine rotor blade; and a second high-speed turbine rotor blade spaced from the first high-speed turbine rotor blade along the axial direction, wherein the radial inner end of the first high-speed turbine rotor blade is coupled to the radial inner end of the second high-speed turbine rotor blade.

For example, in certain exemplary embodiments the plurality of high-speed turbine rotor blades further includes a third high-speed turbine rotor blade spaced from the second high-speed turbine rotor blade along the axial direction, the radial outer end of the second high-speed turbine rotor blade coupled to the radial outer end of the third high-speed turbine rotor blade.

For example, in certain exemplary embodiments the first high-speed turbine rotor blade is positioned between the first and second low-speed turbine rotor blades along the axial direction, wherein the second high-speed turbine rotor blade is positioned forward of the third low-speed turbine rotor blade along the axial direction, and wherein the third high-speed turbine rotor blade is positioned between the second and third low-speed turbine rotor blades along the axial direction.

For example, in certain exemplary embodiments the turbine further includes a stage of turbine stator vanes positioned between the second and third low-speed turbine rotor blades along the axial direction.

In certain exemplary embodiments the turbomachine further includes a gearbox, wherein the plurality of turbine rotor blades is a first plurality of turbine rotor blades, and wherein the turbine further includes a second plurality of turbine rotor blades, wherein the first plurality of turbine rotor blades and the second plurality of turbine rotor blades are rotatable with one another through the gearbox.

For example, in certain exemplary embodiments the first plurality of turbine rotor blades is configured to rotate in a first circumferential direction, and wherein the second plurality of turbine rotor blades is configured to rotate in a second circumferential direction opposite the first circumferential direction.

In certain exemplary embodiments the first and second turbine rotor blades are mechanically coupled through an outer drum, and wherein the second and third turbine rotor blades are mechanically coupled through an inner drum.

In another exemplary embodiment of the present disclosure, a turbine for a turbine section of a turbomachine defining an axial direction and a radial direction is provided. The turbine includes a plurality of turbine rotor blades spaced along the axial direction, each turbine rotor blade extending generally along the radial direction between a radial inner end and a radial outer end. The plurality of turbine rotor blades includes a first turbine rotor blade; and a second turbine rotor blade spaced from the first turbine rotor blade along the axial direction, the radial outer end of the first turbine rotor blade coupled to the radial outer end of the second turbine rotor blade. The plurality of turbine rotor blades also includes a third turbine rotor blade spaced from the second turbine rotor blade along the axial direction, the radial inner end of the second turbine rotor blade coupled to the radial inner end of the third turbine rotor blade.

In certain exemplary embodiments the first turbine rotor blade, the second turbine rotor blade, and the third turbine rotor blade are each spaced sequentially along the axial direction.

In certain exemplary embodiments the plurality of turbine rotor blades is a first plurality of turbine rotor blades, and wherein the turbine further includes a second plurality of turbine rotor blades, wherein the second plurality of turbine rotor blades includes at least one turbine rotor blade positioned between the first and second turbine rotor blades of the first plurality of turbine rotor blades or between the second and third turbine rotor blades of the first plurality of turbine rotor blades.

In certain exemplary embodiments the plurality of turbine rotor blades is a plurality of low-speed turbine rotor blades.

For example, in certain exemplary embodiments the turbine further includes a plurality of high-speed turbine rotor blades, wherein each of the high-speed turbine rotor blades extend generally along the radial direction between a radial inner end and a radial outer end. With such an exemplary embodiment, the plurality of high-speed turbine rotor blades may further include a first high-speed turbine rotor blade; and a second high-speed turbine rotor blade spaced from the first high-speed turbine rotor blade along the axial direction, wherein the radial inner end of the first high-speed turbine rotor blade is coupled to the radial inner end of the second high-speed turbine rotor blade.

For example, in certain exemplary embodiments the plurality of high-speed turbine rotor blades may further include a third high-speed turbine rotor blade spaced from the second high-speed turbine rotor blade along the axial direction, the radial outer end of the second high-speed turbine rotor blade coupled to the radial outer end of the third high-speed turbine rotor blade.

For example, in certain exemplary embodiments the first high-speed turbine rotor blade is positioned between the first and second low-speed turbine rotor blades along the axial direction, wherein the second high-speed turbine rotor blade is positioned forward of the third low-speed turbine rotor blade along the axial direction, and wherein the third high-speed turbine rotor blade is positioned between the second and third low-speed turbine rotor blades along the axial direction.

In certain exemplary embodiments the first and second turbine rotor blades are mechanically coupled through an outer drum, and wherein the second and third turbine rotor blades are mechanically coupled through an inner drum.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
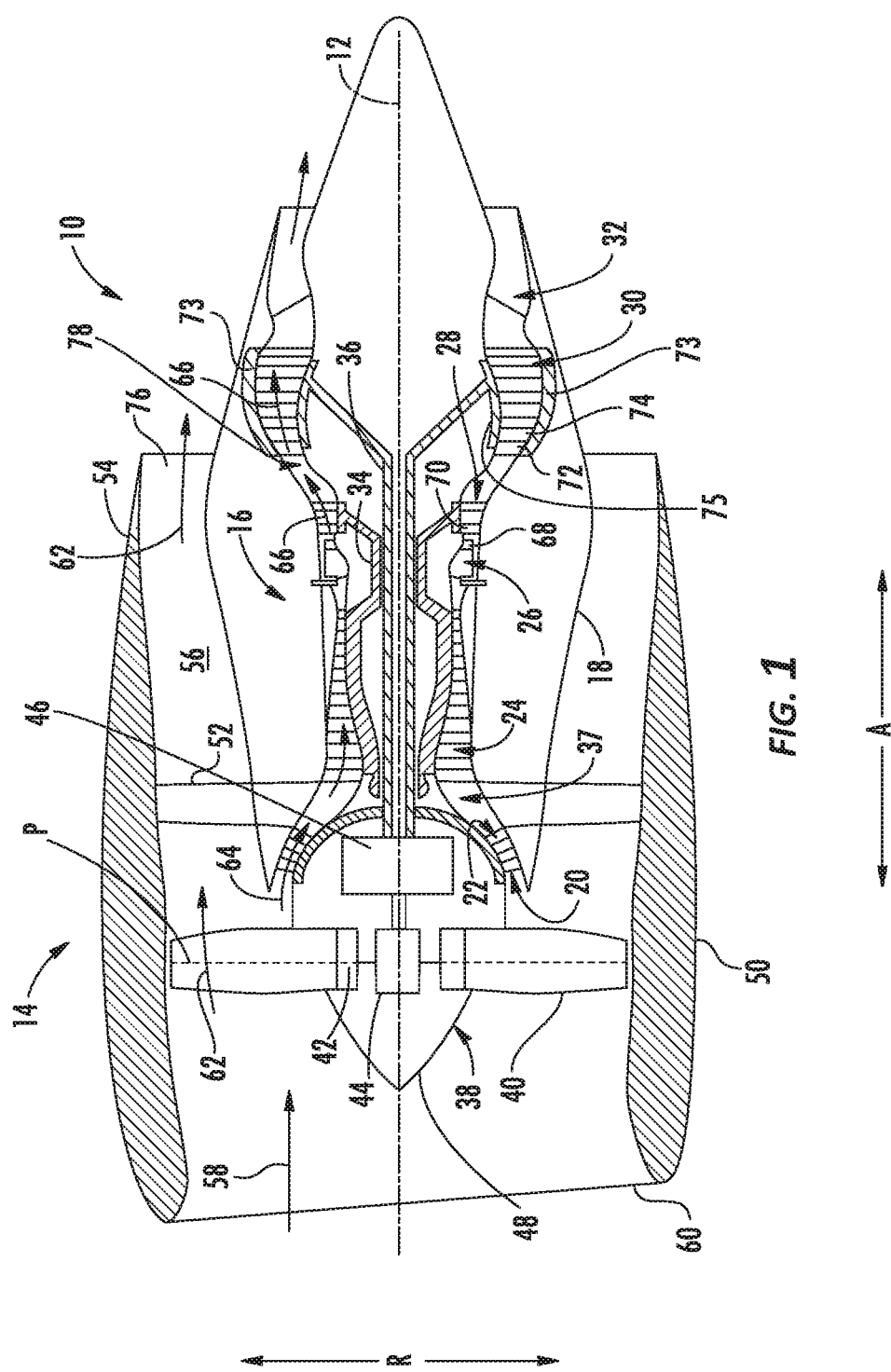
FIG. 1 is a schematic cross sectional view of an exemplary gas turbine engine incorporating an exemplary embodiment of a turbine section according to an aspect of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The terms "low-speed" and "high-speed" refer to relative speeds, such as relative rotational speeds, of two components during operations of the turbomachine, and do not imply or require any minimum or maximum absolute speeds.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a turbomachine having a turbine section, the turbine section including a turbine with a first plurality of turbine rotor blades coupled using a split drum configuration. More specifically, the first plurality of turbine rotor blades includes at least a first turbine rotor blade, a second turbine rotor blade, and a third turbine rotor blade, each spaced along an axial direction of the turbomachine. The first and second turbine rotor blades of the first plurality of turbine rotor blades are coupled at respective radial inner ends, while the second and third turbine rotor blades of the first plurality of turbine rotor blades are coupled at respective radial outer ends. Such a configuration may result in shorter drums, which may reduce vibration modes during operation of the turbomachine.

Notably, in at least certain exemplary embodiments, the turbine may further include a second plurality of turbine rotor blades alternatingly spaced with the first plurality of turbine rotor blades. The second plurality of turbine rotor blades may counter rotate with the first plurality of turbine rotor blades, and may also be attached using a split drum configuration.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, and turbine section together define a core air flowpath 37 extending from the annular inlet 20 through the LP compressor 22, HP compressor 24, combustion section 26, HP turbine section 28, LP turbine section 30 and jet nozzle exhaust section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front spinner cone 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that for the embodiment depicted, the nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to an inner casing (not shown) and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of a first plurality of LP turbine rotor blades 72 that are coupled to an outer drum 73, and a second plurality of LP turbine rotor blades 74 that are coupled to an inner drum 75. The first plurality of LP turbine rotor blades 72 and second plurality of LP turbine rotor blades 74 are alternatingly spaced and rotatable with one another through a gearbox (not shown) to together drive the LP shaft or spool 36, thus causing the LP shaft or spool 36 to rotate. Such thereby supports operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbine fan engine 10 may instead be configured as any other suitable turbomachine including, e.g., any other suitable number of shafts or spools, and excluding, e.g., the power gearbox 46 and/or fan 38, etc. Accordingly, it will be appreciated that in other exemplary embodiments, the turbofan engine 10 may instead be configured as, e.g., a turbojet engine, a turboshaft engine, a turboprop engine, etc., and further may be configured as an aeroderivative gas turbine engine or industrial gas turbine engine.

Figure 2:
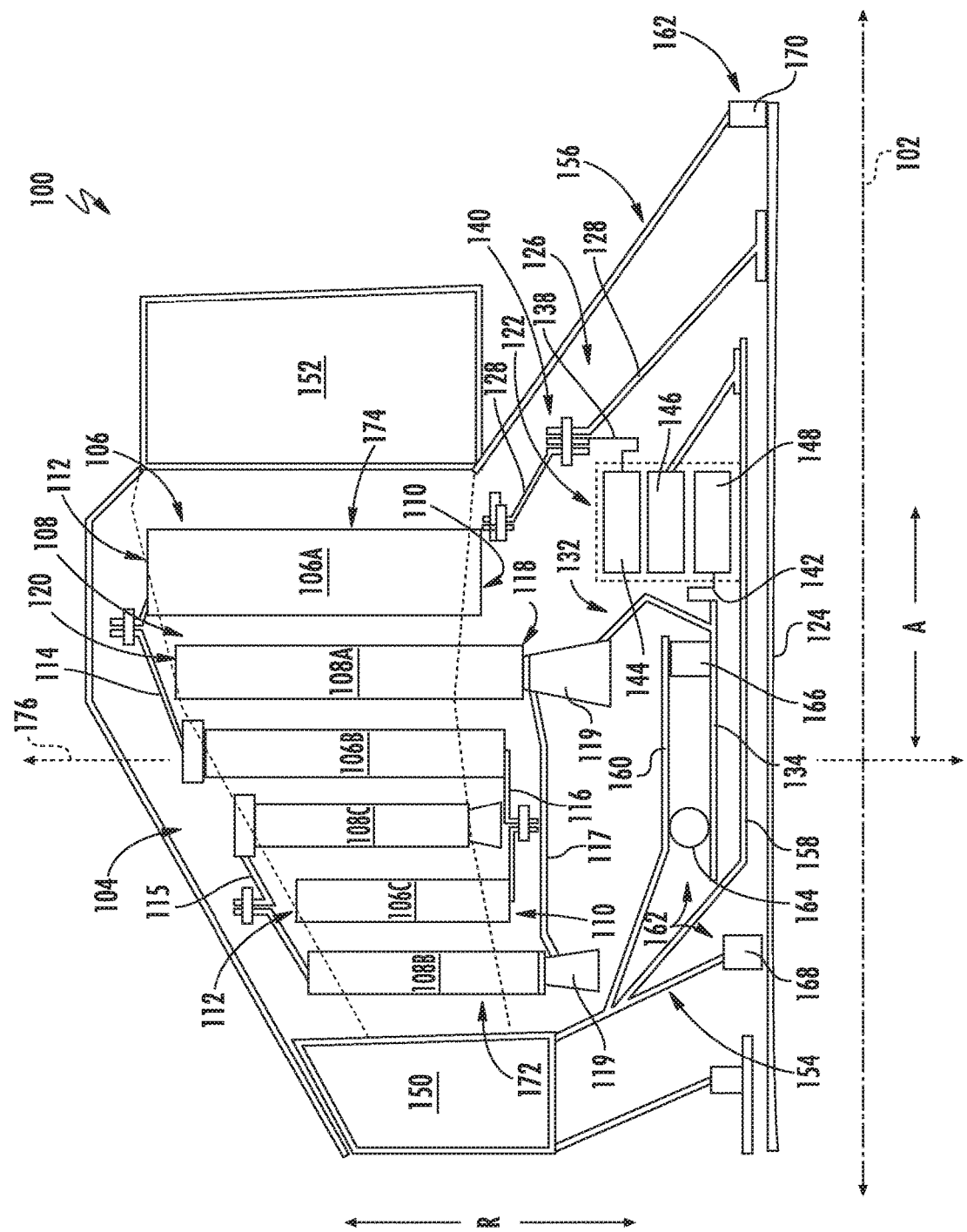
FIG. 2 is a close-up, schematic, cross sectional view of a turbine section in accordance with an exemplary aspect of the present disclosure.

Referring now to FIG. 2, a schematic, side, cross-sectional view is provided of a turbine section 100 of a turbomachine in accordance with an exemplary embodiment of the present disclosure. The exemplary turbine section 100 depicted in FIG. 2 may be incorporated into, e.g., the exemplary turbofan engine 10 described above with reference to FIG. 1. However, in other exemplary embodiments, the turbine section 100 may be integrated into any other suitable machine utilizing a turbine.

Accordingly, it will be appreciated that the turbomachine generally defines a radial direction R, an axial direction A, and a longitudinal centerline 102. Further, the turbine section 100 includes a turbine 104, with the turbine 104 of the turbine section 100 being rotatable about the axial direction A (i.e., includes one or more components rotatable about the axial direction A). For example, in certain embodiments, the turbine 104 may be a low pressure turbine (such as the exemplary low pressure turbine 30 of FIG. 1), or alternatively may be any other turbine (such as, a high pressure turbine, an intermediate turbine, a dual use turbine functioning as part of a high pressure turbine and/or a low pressure turbine, etc.).

Moreover, for the exemplary embodiment depicted, the turbine 104 includes a plurality of turbine rotor blades spaced along the axial direction A. More specifically, for the exemplary embodiment depicted, the turbine 104 includes a first plurality of turbine rotor blades 106 and a second plurality of turbine rotor blades 108. As will be discussed in greater detail below, the first plurality of turbine rotor blades 106 and second plurality of turbine rotor blades 108 are alternatingly spaced along the axial direction A.

Referring first to the first plurality of turbine rotor blades 106, each of the first plurality of turbine rotor blades 106 extends generally along the radial direction R between a radial inner end 110 and a radial outer end 112. Additionally, the first plurality of turbine rotor blades 106 includes a first turbine rotor blade 106A, a second turbine rotor blade 106B, and a third turbine rotor blade 106C, each spaced apart from one another along the axial direction A. Further, the first plurality of turbine rotor blades 106 are coupled through a split drum configuration. For example, the radial outer end 112 of the first turbine rotor blade 106A is mechanically coupled to the radial outer end 112 of the second turbine rotor blade 106B, and the radial inner end 110 of the second turbine rotor blade 106B is mechanically coupled to the radial inner end 110 of the third turbine rotor blade 106C. More specifically, for the embodiment depicted, the first turbine rotor blade 106A and second turbine rotor blade 106B of the first plurality of turbine rotor blades 106 are mechanically coupled through a first outer drum 114. Similarly, for the embodiment depicted, the second turbine rotor blade 106B and the third turbine rotor blade 106C of the first plurality of turbine rotor blades 106 are mechanically coupled through a first inner drum 116.

Notably, for the embodiment depicted, the first turbine rotor blade 106A, the second turbine rotor blade 106B, and the third turbine rotor blade 106C of the first plurality of turbine rotor blades 106 are each spaced sequentially along the axial direction A.

Referring now to the second plurality of turbine rotor blades 108, the second plurality of turbine rotor blades 108 generally includes a first turbine rotor blade 108A, a second turbine rotor blade 108B, and a third turbine rotor blade 108C, each of which extending generally along the radial direction R between a radial inner end 118 and a radial outer end 120. Further, the second plurality of turbine rotor blades 108 are, for the embodiment depicted, similarly attached using a split drum configuration. For example, the radial inner end 118 of the first turbine rotor blade 108A is mechanically coupled to the radial inner end 118 of the second turbine rotor blade 108B, and further, the radial outer end 120 of the second turbine rotor blade 108B is mechanically coupled to the radial outer end 120 of the third turbine rotor blade 108C. More specifically, for the embodiment depicted, the first turbine rotor blade 108A and second turbine rotor blade 108B of the second plurality of turbine rotor blades 108 are mechanically coupled through a second inner drum 117. Similarly, for the embodiment depicted, the second turbine rotor blade 108B and the third turbine rotor blade 108C of the second plurality of turbine rotor blades 108 are mechanically coupled through a second outer drum 115.

It should be appreciated that as used herein, "coupled at the radial inner ends" and "coupled at the radial outer ends" refers generally to any direct or indirect coupling means or mechanism to connect the components. For example, as is depicted for the embodiment of FIG. 2, the second plurality of turbine rotor blades 108 may include multiple stages of rotors 119 spaced along the axial direction A, with the first turbine rotor blade 108A and the third turbine rotor blade 108C coupled to the respective stages of rotors 119 at the respectively radial inner ends 118 through, e.g. dovetail base portions (not shown). The respective stages of rotors 119 to which the first turbine rotor blade 108A and the second turbine rotor blade 108B are attached are, in turn, coupled together through, e.g., the second inner drum 117 for the embodiment depicted, to therefore couple the first turbine rotor blade 108A and the second turbine rotor blade 108B of the second plurality of turbine rotor blades 108 at their respective radial inner ends 118.

As previously stated, for the embodiment depicted, the first plurality of turbine rotor blades 106 and second plurality of turbine rotor blades 108 are alternatingly spaced along the axial direction A. More specifically, as used herein, the term "alternatingly spaced along the axial direction A" refers to the second plurality of turbine rotor blades 108 including at least one turbine rotor blade positioned along the axial direction A between two axially spaced turbine rotor blades of the first plurality of turbine rotor blades 106. For example, for the embodiment depicted, alternatingly spaced along the axial direction A refers to the second plurality of turbine rotor blades 108 including at least one turbine rotor blade positioned between the first and second turbine rotor blades 106A, 106B of the first plurality of turbine rotor blades 106 along the axial direction A, or between the second and third turbine rotor blades 106B, 106C of the first plurality of turbine rotor blades 106 along the axial direction A.

Moreover, for the embodiment depicted, the turbomachine further includes a gearbox 122 and a spool 124, with the first plurality of turbine rotor blades 106 and the second plurality of turbine rotor blades 108 rotatable with one another through the gearbox 122. In at least certain exemplary embodiments, the spool 124 may be configured as, e.g., the exemplary low pressure spool 36 described above with reference to FIG. 1. It should be appreciated, however, that in other exemplary embodiments, the spool 124 may be any other spool (e.g., a high pressure spool, an intermediate spool, etc.), and further that the gearbox 122 may be any other suitable speed change device. For example, in other exemplary embodiments, the gearbox 122 may instead be a hydraulic torque converter, an electric machine, a transmission, etc.

Referring still to FIG. 2, the turbine section 100 includes a first support member assembly 126 having a first support member 128 and a second support member assembly 132 having a second support member 134. The first support member 128 couples the radial inner end 110 of the first turbine rotor blade 106A of the first plurality of turbine rotor blades 106 to the spool 124, and further couples the first plurality of turbine rotor blades 106 to the gearbox 122. Additionally, the second support member 134 similarly couples the second plurality of turbine rotor blades 108, or rather the radial inner end 118 of the first turbine rotor blade 108A of the second plurality of turbine rotor blades 108, to the gearbox 122. Notably, however, in other exemplary embodiments, the first support member 128 may couple to any of the other turbine rotor blades within the first plurality of turbine rotor blades 106 at a radial inner end 110 (either directly or through, e.g., a rotor—similar to rotors 119), and similarly, the second support member 134 may couple to any of the other turbine rotor blades of the second plurality of turbine rotor blades 108 at the radial inner ends 118 (either directly or through, e.g., the rotors 119).

Further, for the embodiment depicted the first support member assembly 126 includes a first flexible connection 138 attached to the first support member 128 at a juncture 140 of the first support member 128 (although, in other embodiments, the first flexible connection 138 may be formed integrally with the first support member 128). Similarly, the second support member assembly 132 includes a second flexible connection 142 attached to, or formed integrally with, the second support member 134. The first flexible connection 138 and second flexible connection 142 allow for a less rigid connection between the gearbox 122 and the first support member 128 and second support member 134, respectively. More particularly, the first flexible connection 138 and the second flexible connection 142 allow for a less rigid connection between the gearbox 122 and the first plurality of turbine rotor blades 106 and the second plurality of turbine rotor blades 108, respectively. In certain embodiments, the first flexible connection 138, the second flexible connection 142, or both, may be configured as members having bellows, splined connections with resilient material, etc.

As is depicted, for the embodiment depicted, the gearbox 122 is configured as a planetary gear box including a ring gear 144, a planet gear 146 (or rather a plurality of planet gears 146, coupled to a planet gear carrier, not shown), and a sun gear 148. The first support member 128 is coupled to the ring gear 144 and the second support member 134 is coupled to the sun gear 148. Accordingly, the first plurality of turbine rotor blades 106 is coupled to the first gear, i.e., the ring gear 144, of the gearbox 122 through the first support member 128, and the second plurality of turbine rotor blades 108 is coupled to the second gear, i.e., the sun gear 148, of the gearbox 122 through the second support member 134. Additionally, the exemplary turbine section 100 depicted further includes a turbine center frame 150, a turbine rear frame 152, a center frame support assembly 154 coupled to the turbine center frame 150, and a rear frame support assembly 156 coupled to the turbine rear frame 152. The center frame support assembly 154, for the embodiment depicted, includes a radial inner center frame support member 158 and a radial outer center frame support member 160. The plurality of planet gears 146 (or the planet gear carrier, not shown) are fixedly coupled to the turbine center frame 150 through the center frame support assembly 154, and more particularly, through the radial inner center frame support member 158 of the center frame support assembly 154.

In such a manner, it will be appreciated that for the embodiment depicted, the first plurality of turbine rotor blades 106 are configured to rotate in an opposite direction than the second plurality of turbine rotor blades 108. For example, the first plurality of turbine rotor blades 106 may be configured to rotate in a first circumferential direction C1 (see FIG. 4, below), while the second plurality of turbine rotor blades 108 may be configured to rotate in a second circumferential direction C2 (see FIG. 4, below), opposite the first circumferential direction C1.

It should further be understood that the first circumferential direction C1 and the second circumferential direction C2 as used and described herein are intended to denote directions relative to one another. Therefore, the first circumferential direction C1 may refer to a clockwise rotation (viewed from downstream looking upstream) and the second circumferential direction C2 may refer to a counter-clockwise rotation (viewed from downstream looking upstream). Alternatively, the first circumferential direction C1 may refer to a counter-clockwise rotation (viewed from downstream looking upstream) and the second circumferential direction C2 may refer to a clockwise rotation (viewed from downstream looking upstream).

Moreover, it will be appreciated that for the embodiment depicted, the first plurality of turbine rotor blades 106 is configured as a plurality of low-speed turbine rotor blades, while the second plurality of turbine rotor blades 108 is configured as a plurality of high-speed turbine rotor blades. Such may be due to the gearing of the gearbox 122 and the fact that the first plurality of turbine rotor blades 106 are directly rotatable with the spool 124 (which may limit a rotational speed of the first plurality of turbine rotor blades 106). Regardless, it will be appreciated that for the embodiment depicted the plurality of low-speed turbine rotor blades and high-speed turbine rotor blades are alternatingly spaced as follows: a first high-speed turbine rotor blade (i.e., the first turbine rotor blade 108A of the second plurality of turbine rotor blades 108) is positioned between a first low-speed turbine rotor blade and a second low-speed turbine 104 blade (i.e., the first and second turbine rotor blades 106A, 106B of the first plurality of turbine rotor blades 106) along the axial direction A; a second high-speed turbine rotor blade (i.e., the second turbine rotor blade 108B of the second plurality of turbine rotor blades 108) is positioned forward of a third low-speed turbine rotor blade (i.e., the third turbine rotor blade 106C of the first plurality of turbine rotor blades 106) along the axial direction A; and a third high-speed turbine rotor blade (i.e., the third turbine rotor blade 108C of the second plurality of turbine rotor blades 108) is positioned between a second low-speed turbine rotor blade and the third low-speed turbine rotor blade (i.e., the second and third turbine rotor blades 106B, 106C of the first plurality of turbine rotor blades 106) along the axial direction A.

Notably, it will be appreciated that for the embodiments described herein, the first turbine rotor blade 106A, second turbine rotor blade 106B, and third turbine rotor blade 106C of the first plurality of turbine rotor blades 106 generally represent a first stage of turbine rotor blades, a second stage of turbine rotor blades, and a third stage of turbine rotor blades, respectively. Similarly, the first turbine rotor blade 108A, second turbine rotor blade 108B, and third turbine rotor blade 108C of the second plurality of turbine rotor blades 108 each also generally represent a first stage of turbine rotor blades, a second stage of turbine rotor blades, and a third stage of turbine rotor blades, respectively. An example of such a configuration may be seen more clearly in FIG. 4, described below.

Inclusion of a first plurality of turbine rotor blades coupled through a split drum configuration may allow for an overall reduction in vibration modes of an outer drum coupling such first plurality of turbine rotor blades. More specifically, inclusion of a split drum configuration results in an outer drum with a reduced axial length, which may assist with reducing such unwanted vibration modes during operation of the turbomachine.

Referring still to the embodiment of FIG. 2, the turbine section 100 additionally includes a bearing assembly 162. The bearing assembly 162 includes a first bearing 164 and a second bearing 166, the first bearing 164 and the second bearing 166 each rotatably supporting the second support member 134. Additionally, the first bearing 164 and the second bearing 166 are each supported by the turbine center frame 150, and more specifically, are supported by the radial outer center frame support member 160 of the center frame support assembly 154, such that the first bearing 164 and the second bearing 166 of the bearing assembly 162 are positioned between the radial outer center frame support member 160 of the center frame support assembly 154 and the second support member 134 of the second support member assembly 132. More specifically, for the embodiment depicted, the first bearing 164 and the second bearing 166 each support the second support member 134 of the second support member assembly 132 at a radial inner side (not labeled) and are supported by the radial outer center frame support member 160 of the turbine center frame support member assembly 154 at a radial outer side (not labeled).

Further, for the embodiment depicted the first bearing 164 and the second bearing 166 are each axially aligned with the first plurality of turbine rotor blades 106, the second plurality of turbine rotor blades 108, or both. More specifically, the first bearing 164 and the second bearing 166 are each positioned aft of a forward-most forward edge 172 of the forward-most turbine rotor blade of the first plurality of turbine rotor blades 106 and second plurality of turbine rotor blades 108, of turbine 104, and further are each positioned forward of an aft-most aft edge 174 of the aft-most turbine rotor blade of the first plurality of turbine rotor blades 106 and second plurality of turbine rotor blades 108. More specifically, still, for the embodiment depicted, the turbine 104 further defines a midpoint 176 along the axial direction A, and the first bearing 164 is positioned forward of the midpoint 176 of the turbine 104 and the second bearing 166 is positioned aft of the midpoint 176 of the turbine 104. With such a configuration, the first bearing 164 and second bearing 166 may be oriented with a center of mass of the turbine 104 to more effectively rotatably support the turbine 104. Notably, as used herein the term "midpoint" refers generally to an axial location halfway between the forward-most forward edge 172 of the forward-most turbine rotor blade of the turbine 104 and the aft-most aft edge 174 of the aft-most turbine rotor blade of the turbine 104.

Furthermore, for the embodiment depicted, the bearing assembly 162 additionally includes a third bearing 168 and a fourth bearing 170. The third bearing 168 and the fourth bearing 170 of the bearing assembly 162 each rotatably support the spool 124. More particularly, the third bearing 168 is supported by the turbine center frame 150 through the center frame support assembly 154 and the fourth bearing 170 is supported by the turbine rear frame 152 through the rear frame support assembly 156.

As is depicted schematically, for the embodiment depicted the first bearing 164 is configured as a ball bearing and the second bearing 166, third bearing 168, and fourth bearing 170 are each configured as a roller bearing. However, in other exemplary embodiments, the first bearing 164, second bearing 166, third bearing 168, and fourth bearing 170 may instead be configured in any other suitable manner, such as the other of a roller bearing or ball bearing, or alternatively, as a tapered roller bearing, an air bearing, etc.

It should further be appreciated that in other exemplary embodiments, the turbine 104 depicted in FIG. 2 may have still any other suitable configuration. For example, in other exemplary embodiments, the turbine 104 may have any other suitable configuration of bearings of the bearing assembly 162, any other suitable location of the gearbox 122, may include any other suitable configuration for the first plurality of turbine rotor blades 106, and further may have any other suitable configuration for the second plurality of turbine rotor blades 108. Further, in other exemplary embodiments, although for the embodiment depicted the first and second pluralities of turbine rotor blades 106, 108 each includes three turbine rotor blades, in other exemplary embodiments, one or both of the first and second pluralities of turbine rotor blades 106, 108 may include any other suitable number of stages of turbine rotor blades, such as two, four, etc. Moreover, in other exemplary embodiments, the turbine section 100 and turbine 104 may not include each of the components described above with reference to, and depicted in, FIG. 2, and further may include any other suitable components not described above with reference to, or depicted in, FIG. 2.

Figure 3:
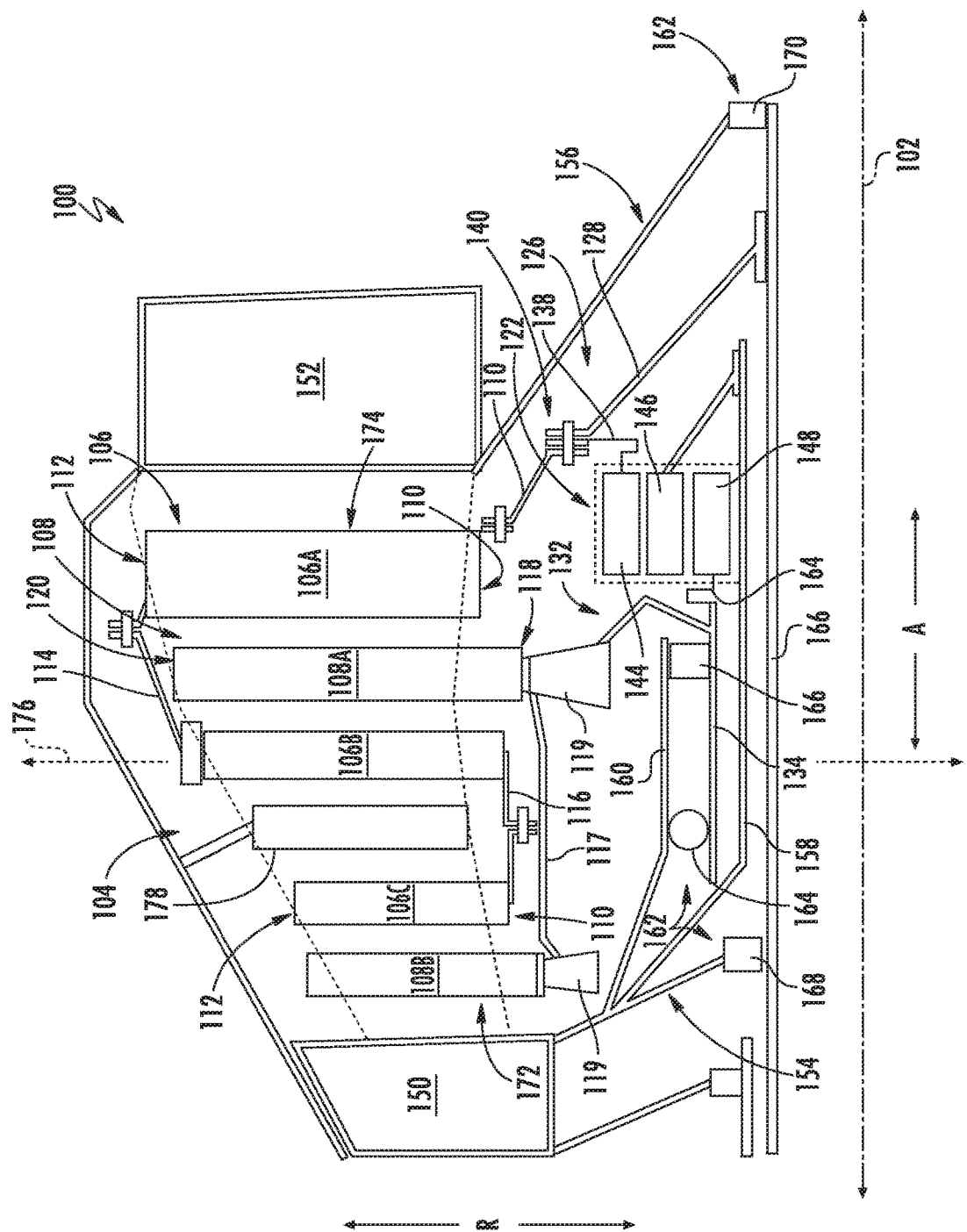
FIG. 3 is a close-up, schematic, cross sectional view of a turbine section in accordance with another exemplary aspect of the present disclosure.

For example, referring now to FIG. 3, a turbine 104 in accordance with another exemplary embodiment of the present disclosure is depicted. The exemplary turbine 104 depicted in FIG. 3 may be configured in substantially the same manner as exemplary turbine 104 of FIG. 2, and accordingly, the same or similar numbers refer to the same or similar parts.

For example, the exemplary turbine 104 of FIG. 3 generally includes a first plurality of turbine rotor blades 106 and a second plurality of turbine rotor blades 108, the first plurality of turbine rotor blades 106 and second plurality of turbine rotor blades 108 alternatingly spaced along the axial direction A. The first plurality of turbine rotor blades 106 generally includes a first turbine rotor blade 106A spaced along the axial direction A from a second turbine rotor blade 106B, the first and second turbine rotor blades 106A, 106B mechanically coupled at the respective radial outer ends 112. Additionally, for the embodiment depicted, the first plurality of turbine rotor blades 106 further includes a third turbine rotor blade 106C spaced along the axial direction A from the second turbine rotor blade 106B, with the second and third turbine rotor blades 106B, 106C mechanically coupled at the respective radial inner ends 110.

Moreover, the second plurality of turbine rotor blades 108 of the exemplary turbine 104 of FIG. 3 also includes a first turbine rotor blade 108A and a second turbine rotor blade 108B spaced along the axial direction A and mechanically coupled at the respective radial inner ends 120. However, for the embodiment depicted, the second plurality of turbine rotor blades 108 does not include a third turbine rotor blade 108C spaced along the axial direction A from the first and second turbine rotor blades 108A, 108B (cf. FIG. 2). Instead, for the exemplary embodiment of FIG. 3, the turbine 104 includes a stage of turbine stator vanes 178 positioned between the second turbine rotor blade 106B and the third turbine rotor blade 106C of the first plurality of turbine rotor blades 106.

It will further be appreciated that in still other exemplary embodiments, the turbine 104 may not include a second plurality of turbine rotor blades 108, and instead may include multiple stages of turbine stator vanes (including stage 178) spaced along the axial direction A. With such an exemplary embodiment, the turbine 104 may or may not include a stage of turbine rotor blades (such as the stage of turbine rotor blades represented by the first turbine rotor blade 108A of the second plurality of turbine rotor blades 108) rotatable with the first plurality of turbine rotor blades 106 through, e.g., a gearbox 122.

Figure 4:
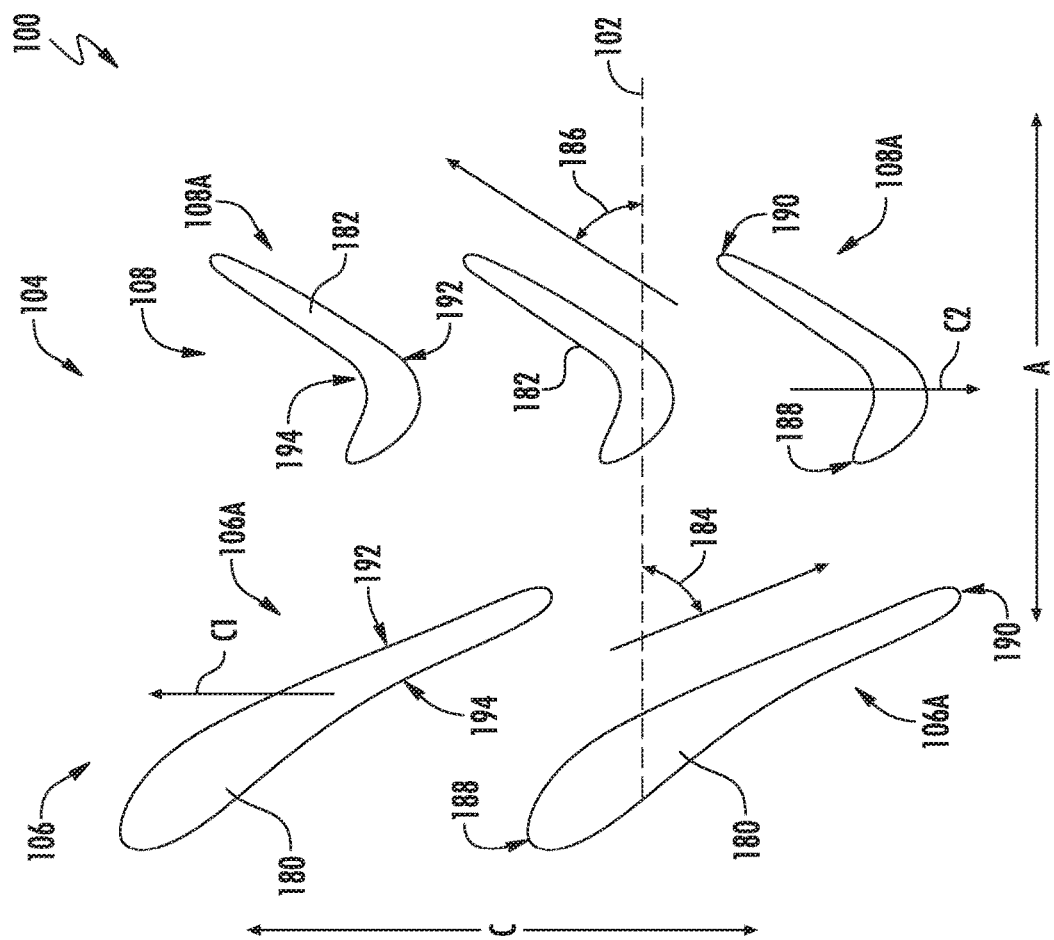
FIG. 4 is cross sectional view depicting exemplary blade pitch angles of a turbine of a turbine section in accordance with an exemplary embodiment of the present disclosure.

Referring now to FIG. 4, an exemplary embodiment of an orientation of the first plurality of turbine rotor blades 106 and the second plurality of turbine rotor blades 108 is generally provided. The first plurality of turbine rotor blades 106 and the second plurality of turbine rotor blades 108 may be the same rotor blades discussed above with reference to, e.g., FIGS. 2 and 3.

More specifically, the embodiment of FIG. 4 depicts a first stage of turbine rotor blades 106A of the first plurality of turbine rotor blades 106 and a first stage of turbine rotor blades 108A of the second plurality of turbine rotor blades 108. In at least certain exemplary embodiments, the first plurality of turbine rotor blades may be configured to rotate in a first circumferential direction C1, while the second plurality of turbine rotor blades may be configured to rotate in a second circumferential direction C2.

It will be appreciated that for the embodiment depicted, each of the turbine rotor blades 106A of the first plurality of turbine rotor blades 106 include an airfoil 180, and similarly, each of the turbine rotor blades 108A of the second plurality of turbine rotor blades 108 include an airfoil 182. The airfoils 180 each define an exit angle 184, and similarly the airfoils 182 each define an exit angle 186. The exit angles 184, 186 each represent an angular relationship of a longitudinal centerline 102 (i.e., of the turbomachine within which they are installed) to an exit direction of the gases flowing from an upstream end 188 towards a downstream end 190 of the respective airfoils 180, 182. For the embodiment depicted, the exit angle 184 may be a negative angle, such as a negative acute angle, while the exit angle 186 may be a positive angle, such as a positive acute angle ("positive" and "negative" being used herein to denote a relative value of the respective exit angles 184, 186 viewed from the same perspective). Notably, the exit angles 184, 186 of the airfoils 180, 182, respectively, cause the first plurality of turbine rotor blades 106 and second plurality of turbine rotor blades 108 to rotate in the first and second circumferential directions C1, C2, respectively.

Referring still to FIG. 4, the airfoils 180, 182 may each further include a suction side 192 and a pressure side 194. The suction side 192 of the airfoils 180 are configured as convex toward the first circumferential direction C1 and the pressure side 194 of the airfoils 180 are configured as concave toward the first circumferential direction C1. The suction side 192 of the airfoils 182 are configured as convex toward the second circumferential direction C2 and the pressure side 194 of the airfoils 180 are configured as concave toward the second circumferential direction C2. Such a configuration may further result in the first plurality of turbine rotor blades 106 and second plurality of turbine rotor blades 108 rotating in the first and second circumferential directions C1, C2, respectively.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbomachine defining a radial direction and an axial direction, the turbomachine comprising:
    a spool; and
    a turbine section comprising a turbine, the turbine having a plurality of turbine rotor blades spaced along the axial direction, each turbine rotor blade extending generally along the radial direction between a radial inner end and a radial outer end, the plurality of turbine rotor blades comprising
        a first turbine rotor blade, wherein the first turbine rotor blade is coupled to the spool at the inner end of the first turbine rotor blade through a first support member assembly;
        a second turbine rotor blade spaced from the first turbine rotor blade along the axial direction, the radial outer end of the first turbine rotor blade coupled to the radial outer end of the second turbine rotor blade; and
        a third turbine rotor blade spaced from the second turbine rotor blade along the axial direction, the radial inner end of the second turbine rotor blade coupled to the radial inner end of the third turbine rotor blade.

2. The turbomachine of claim 1, wherein the first turbine rotor blade, the second turbine rotor blade, and the third turbine rotor blade are each spaced sequentially along the axial direction.

3. The turbomachine of claim 1, wherein the plurality of turbine rotor blades is a first plurality of turbine rotor blades, and wherein the turbine further comprises a second plurality of turbine rotor blades, wherein the second plurality of turbine rotor blades includes at least one turbine rotor blade positioned between the first and second turbine rotor blades of the first plurality of turbine rotor blades or between the second and third turbine rotor blades of the first plurality of turbine rotor blades.

4. The turbomachine of claim 1, wherein the plurality of turbine rotor blades is a plurality of low-speed turbine rotor blades, wherein the turbine further comprises a plurality of high-speed turbine rotor blades, wherein each of the high-speed turbine rotor blades extend generally along the radial direction between a radial inner end and a radial outer end, and wherein the plurality of high-speed turbine rotor blades comprises:

a first high-speed turbine rotor blade; and
a second high-speed turbine rotor blade spaced from the first high-speed turbine rotor blade along the axial direction, wherein the radial inner end of the first high-speed turbine rotor blade is coupled to the radial inner end of the second high-speed turbine rotor blade.

5. The turbomachine of claim 4, wherein the plurality of high-speed turbine rotor blades further comprises:
a third high-speed turbine rotor blade spaced from the second high-speed turbine rotor blade along the axial direction, the radial outer end of the second high-speed turbine rotor blade coupled to the radial outer end of the third high-speed turbine rotor blade.

6. The turbomachine of claim 5, wherein the first high-speed turbine rotor blade is positioned between the first and second low-speed turbine rotor blades along the axial direction, wherein the second high-speed turbine rotor blade is positioned forward of the third low-speed turbine rotor blade along the axial direction, and wherein the third high-speed turbine rotor blade is positioned between the second and third low-speed turbine rotor blades along the axial direction.

7. The turbomachine of claim 4, wherein the turbine further comprises a stage of turbine stator vanes positioned between the second and third low-speed turbine rotor blades along the axial direction.

8. The turbomachine of claim 1, further comprising:
a gearbox, wherein the plurality of turbine rotor blades is a first plurality of turbine rotor blades, and wherein the turbine further comprises a second plurality of turbine rotor blades, wherein the first plurality of turbine rotor blades and the second plurality of turbine rotor blades are rotatable with one another through the gearbox.

9. The turbomachine of claim 8, wherein the first plurality of turbine rotor blades are configured to rotate in a first circumferential direction, and wherein the second plurality of turbine rotor blades are configured to rotate in a second circumferential direction opposite the first circumferential direction.

10. The turbomachine of claim 1, wherein the first and second turbine rotor blades are mechanically coupled through an outer drum, and wherein the second and third turbine rotor blades are mechanically coupled through an inner drum.

11. A turbine for a turbine section of a turbomachine defining an axial direction and a radial direction, the turbine comprising:
a spool; and
a plurality of turbine rotor blades spaced along the axial direction, each turbine rotor blade extending generally along the radial direction between a radial inner end and a radial outer end, the plurality of turbine rotor blades comprising
a first turbine rotor blade, wherein the first turbine rotor blade is coupled to the spool at the inner end of the first turbine rotor blade through a first support member assembly;
a second turbine rotor blade spaced from the first turbine rotor blade along the axial direction, the radial outer end of the first turbine rotor blade coupled to the radial outer end of the second turbine rotor blade; and
a third turbine rotor blade spaced from the second turbine rotor blade along the axial direction, the radial inner end of the second turbine rotor blade coupled to the radial inner end of the third turbine rotor blade.

12. The turbine of claim 11, wherein the first turbine rotor blade, the second turbine rotor blade, and the third turbine rotor blade are each spaced sequentially along the axial direction.

13. The turbine of claim 11, wherein the plurality of turbine rotor blades is a first plurality of turbine rotor blades, and wherein the turbine further comprises a second plurality of turbine rotor blades, wherein the second plurality of turbine rotor blades includes at least one turbine rotor blade positioned between the first and second turbine rotor blades of the first plurality of turbine rotor blades or between the second and third turbine rotor blades of the first plurality of turbine rotor blades.

14. The turbine of claim 11, wherein the plurality of turbine rotor blades is a plurality of low-speed turbine rotor blades.

15. The turbine of claim 14, wherein the turbine further comprises a plurality of high-speed turbine rotor blades, wherein each of the high-speed turbine rotor blades extend generally along the radial direction between a radial inner end and a radial outer end, and wherein the plurality of high-speed turbine rotor blades comprises:
a first high-speed turbine rotor blade; and
a second high-speed turbine rotor blade spaced from the first high-speed turbine rotor blade along the axial direction, wherein the radial inner end of the first high-speed turbine rotor blade is coupled to the radial inner end of the second high-speed turbine rotor blade.

16. The turbine of claim 15, wherein the plurality of high-speed turbine rotor blades further comprises:
a third high-speed turbine rotor blade spaced from the second high-speed turbine rotor blade along the axial direction, the radial outer end of the second high-speed turbine rotor blade coupled to the radial outer end of the third high-speed turbine rotor blade.

17. The turbine of claim 16, wherein the first high-speed turbine rotor blade is positioned between the first and second low-speed turbine rotor blades along the axial direction, wherein the second high-speed turbine rotor blade is positioned forward of the third low-speed turbine rotor blade along the axial direction, and wherein the third high-speed turbine rotor blade is positioned between the second and third low-speed turbine rotor blades along the axial direction.

18. The turbine of claim 11, wherein the first and second turbine rotor blades are mechanically coupled through an outer drum, and wherein the second and third turbine rotor blades are mechanically coupled through an inner drum.

19. A turbomachine defining a radial direction and an axial direction, the turbomachine comprising:
a turbine section comprising a low speed turbine and a high speed turbine, the low speed turbine having a plurality of low-speed turbine rotor blades spaced along the axial direction and the high speed turbine having a plurality of high-speed turbine rotor blades spaced along the axial direction, each low-speed turbine rotor blade and high speed turbine rotor blade extending generally along the radial direction between a radial inner end and a radial outer end, the plurality of low-speed turbine rotor blades comprising
a first low-speed turbine rotor blade;
a second low-speed turbine rotor blade spaced from the first low-speed turbine rotor blade along the axial direction, the radial outer end of the first low-speed turbine rotor blade coupled to the radial outer end of the second low-speed turbine rotor blade; and a third low-speed turbine rotor blade spaced from the second low-speed turbine rotor blade along the axial direction, the radial inner end of the second low-speed turbine rotor blade coupled to the radial inner end of the third low-speed turbine rotor blade; and wherein the plurality of high-speed turbine rotor blades comprises a first high-speed turbine rotor blade; and a second high-speed turbine rotor blade spaced from the first high-speed turbine rotor blade along the axial direction, wherein the radial inner end of the first high-speed turbine rotor blade is coupled to the radial inner end of the second high-speed turbine rotor blade; and a third high-speed turbine rotor blade spaced from the second high-speed turbine rotor blade along the axial direction, the radial outer end of the second high-speed turbine rotor blade coupled to the radial outer end of the third high-speed turbine rotor blade.

20. The turbomachine of claim 19, wherein the first high-speed turbine rotor blade is positioned between the first and second low-speed turbine rotor blades along the axial direction, wherein the second high-speed turbine rotor blade is positioned forward of the third low-speed turbine rotor blade along the axial direction, and wherein the third high-speed turbine rotor blade is positioned between the second and third low-speed turbine rotor blades along the axial direction.

* * * * *